UNITED STATES PATENT OFFICE.

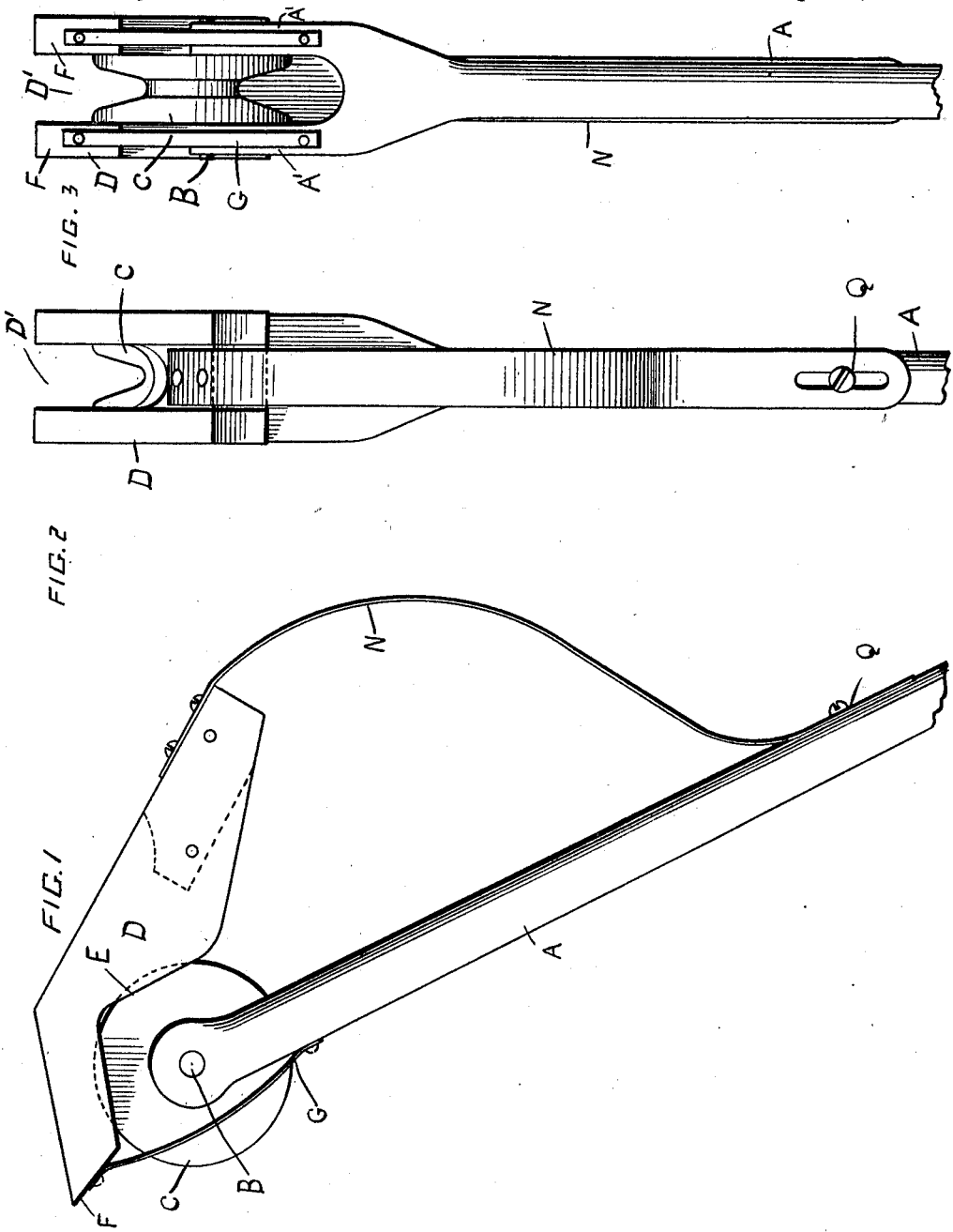

JOHN P. HOFFER, OF ST. LOUIS, MISSOURI.

RESILIENT TROLLEY-GUARD.

1,003,906.  Specification of Letters Patent.  Patented Sept. 19, 1911.

Application filed April 26, 1911. Serial No. 623,548.

*To all whom it may concern:*

Be it known that I, JOHN P. HOFFER, a citizen of the United States, residing at St. Louis city, in the State of Missouri, have invented certain new and useful Improvements in Resilient Trolley-Guards; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient guards for trolley wheels and comprises a simple and efficient device of this character having various details of construction and combinations and arrangements of parts which will be hereinafter fully described and then specifically defined in the appended claims.

I illustrate my invention in the accompanying drawings, in which:—

Figure 1 is a side elevation of a trolley guard made in accordance with my invention. Fig. 2 is an edge view showing the adjustability of the resilient arm which is fastened to the trolley pole, and Fig. 3 is an edge view.

Reference now being had to the details of the drawings by letter, A designates a trolley pole having a slotted end A′ in the walls of which a pivotal pin B is mounted, and C designates the trolley wheel mounted upon said pin.

D designates a trolley guard which has a longitudinal slot D′ therein. The opposite walls of the slot are recessed away forming shoulders E, which preferably extend over the ends of the trolley pole. Said slot or recess formed in the trolley guard is of sufficient width to receive the trolley wheel and fastened to the inclined edges F of the end walls of the slotted trolley guard are leaf springs G, the other ends of which are fastened to the trolley pole adjacent to the slotted end thereof. Said springs allow the forward end of the trolley guard to yield, the downward movement of the guard being limited by the shouldered portion thereof coming in contact with the end of the trolley pole.

A spring N is fastened at one end to the trolley guard and its other end is held by means of an adjustable clamp Q to the trolley pole, thus forming a secure means whereby the trolley guard may be held in different adjusted positions.

From the foregoing, it will be noted that, by the provision of a resilient trolley guard as shown and described, a simple and efficient means is afforded which may be readily fastened to ordinary trolley poles and which will have a tendency to hold the trolley wheel upon the line wire at crossings, going about curves, etc., the guard being held at an inclination readily allowing of the latter being depressed when coming in contact with obstructions, cross lines, etc., and immediately return to its normal position after having passed the same.

What I claim to be new is:—

1. An attachment for trolley poles consisting of a guard which is slotted for the reception of the trolley wheel, springs fastened to the opposite ends of the guard and to the pole, and forming a support for the guard.

2. An attachment for trolley poles consisting of a guard which is slotted for the reception of the trolley wheel, springs fastened at corresponding ends to one end of the trolley guard and their other ends to the trolley pole, a spring support fastened to the other end of the guard and adjustably secured to the pole.

3. In combination with a trolley pole with slotted end, a wheel journaled therein, a trolley guard slotted for the reception of the trolley wheel, shoulders formed upon the trolley guard and adapted to contact with the end of the trolley pole to limit the movement of said guard in one direction, springs fastened at corresponding ends to the trolley guard and to the pole, and a leaf spring secured at one end to the trolley head and its other end adjustably fastened to the pole.

In testimony whereof I hereunto affix my signature in the presence of two witnesses.

JOHN P. HOFFER.

Witnesses:
  EUGENE LEWIS,
  THOS. C. STEPHENS.